Nov. 23, 1965 H. BLAIR 3,219,503
REINFORCED RING OF RESINOUS MATERIAL
Filed March 19, 1962
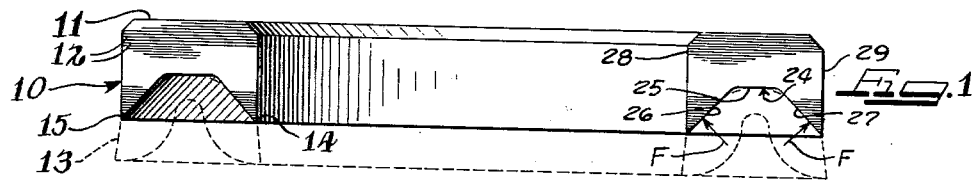
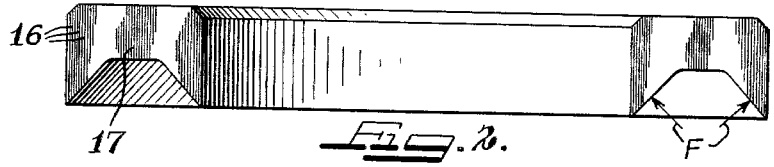
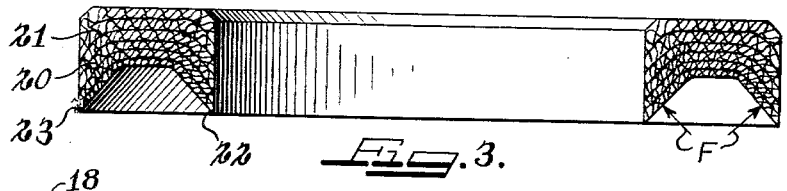
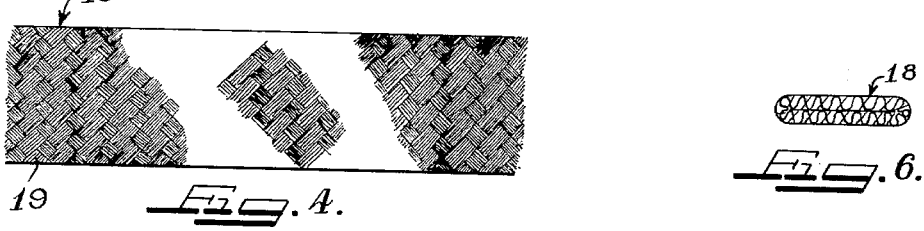
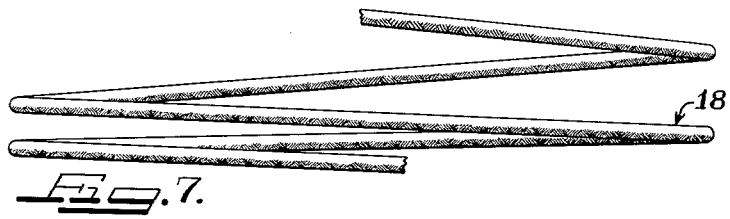
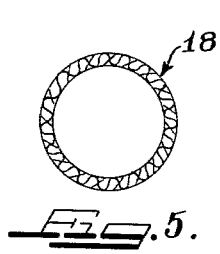
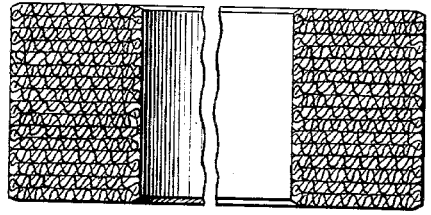
INVENTOR
HAROLD BLAIR United States Patent Office 3,219,503
Patented Nov. 23, 1965

3,219,503
REINFORCED RING OF RESINOUS MATERIAL
Harold Blair, 201 Rainbow Drive, Dundee, Ill.
Filed Mar. 19, 1962, Ser. No. 180,641
3 Claims. (Cl. 156—148)

This invention relates to machine elements made from reinforced thermosetting compounds and to the method by which they are formed. For purposes of illustration it will be described as applied to the fabrication of adapter rings for machinery packing and bushings and to rings or tubes suitable for use as pistons, bearings or the like.

Machine elements made from material other than sheet material are generally machined either from bar or plate stock, or are cast and then machined. Both of these operations are costly. As a substitute, it has been proposed to mold machine elements from thermosetting compounds in such manner that no machining operations are required after the molding operation. Such compounds, however, are brittle and unsatisfactory for applications such as bearings or thrust members requiring resistance to shock loads and hence various reinforcing materials have been suggested for incorporation into the thermosetting compounds to increase their resistance to shock loads.

One method of incorporating reinforcing material into thermosetting compounds is to form a sheet comprised of layers of cloth impregnated with the thermosetting compound, which is then cured to cause the sheets to adhere together. The cured sheet is cut into the desired shape by a machining operation.

A female adapter ring for packing of V-shape in radial cross-section is subject to a spreading action as the packing is compressed against the ring in the gland. In a female adapter ring made from laminated thermosetting material, this wedging action tends to separate portions of the ring along lines parallel with the planes of the laminations of its cloth reinforcement. Adapter rings, male or female, cut from sheet stock are further objectionable because they leave large amounts of waste which adds materially to the cost of each ring.

An object of this invention is the provision of a method of forming rings from thermosetting compounds which are reinforced by woven yarn following in general the contour of the ring, thereby avoiding the formation of striations which produce cracks in the ring when the latter is stressed.

Another object of this invention is the provision of a method of forming rings from thermosetting compounds which are reinforced by threads woven and shaped into ribbons adapted to be coiled into rings from which there results a minimum of waste.

A more specific object of this invention is the provision of a method of forming rings from braided substantially untwisted yarn impregnated with thermosetting compounds and formed into a helically coiled ring-shaped blank which is then molded under heat and pressure to have the desired finished cross-section, said untwisted yarn being forced by the molding pressure into the corners of the ring to add considerable strength to what is otherwise the weakest part of such rings.

As stated above, it is customary in the molding of machine elements from reinforced thermosetting material to effect the setting of the material in two stages. Thus he material is first formed into a sheet comprised of multiple layers of the resin filled partially cured reinforcing cloth bonded together by curing the thermosetting material with heat and pressure. The sheet is next cut to the desired form, to give the blank its final, accurately dimensioned shape. The two curing stages are necessary because it is impossible to work with loose or wet sheets stacked one upon the other.

It is, however, desirable to eliminate the extra or partial curing step and hence it is an object of this invention to form an essentially uncured preform which is sufficiently coherent to be handled in such state and inserted into a heated mold for shaping and curing.

These and other objects of this invention will become apparent from the following detailed description of a preferred illustrative embodiment of the invention when taken together with the accompanying drawings in which:

FIG. 1 is a cross-section through a female adapter ring for V-type packing wherein the ring is made from laminated sheet material in accordance with the prior art;

FIG. 2 is a cross-section through an adapter ring similar to FIG. 1 wherein the ring is made from a tube having cylindrical laminations, again in accordance with the prior art;

FIG. 3 is a cross-section through an adapter ring of the type shown in FIGS. 1 and 2 wherein the ring is made in accordance with the present novel method;

FIG. 4 is a side elevational view of a braided jacket used as the reinforcing material for the ring of FIG. 3;

FIG. 5 is a cross-section through the jacket of FIG. 4 showing its initial cylindrical contour;

FIG. 6 is a cross-section through the jacket of FIGS. 4 and 5 after the cylindrical jacket has been collapsed;

FIG. 7 shows a helix made from the reinforcing material in the FIG. 6 form and prior to its being inserted into a mold; and FIG. 8 is a side elevational view of a tubular end product such as a packing ring or a piston made in accordance with the present invention.

Turning first to FIGURES 1 and 2 for a description of the problems arising from prior art methods of making adapter rings from reinforced thermosetting material, FIG. 1 shows a ring which has been made by taking reinforced resinous sheet material and then cutting out the ring and machining it on a lathe or the like. The sheet must have a thickness equal to the axial dimension of the ring, and the sheet must be formed from alternate layers of thermosetting resin and woven cloth such as duck, canvas or the like. The portion cut out from the center of the ring is wasted, unless it can be utilized to make a ring of smaller dimension. The space between adjoining rings cut from the sheet is likewise wasted, and can only be partially utilized for the production of smaller rings. Such smaller rings, however, are usually of lesser axial extent so that they would normally require thinner sheet stock, and hence involve machining on the sides as well as around the inner and outer peripheries of the ring. The production cost of the sheet material is relatively high because of the built-up nature of the material and the requirement for at least partial curing for subsequent handling, and the cost consequently increases rapidly with the thickness of the sheet. All these factors tend to make the use of reinforced sheet material undesirable from a cost standpoint alone.

In addition to the unfavorable cost factor, the finished ring is inherently weak along the radially disposed planes defined by the reinforcing cloth or duck. Taking the prior art ring 10 shown in FIG. 1, for example, said ring is made from sheet or plate material, the general plane of which coincides with side surface 11 of the ring. The plate material is reinforced by layers of cloth 12 which lie approximately parallel to surface 11. The ring is a female adapter ring for V-shaped packing shown in dotted outline at 13, i.e., and hence said ring is formed with an axially extending groove 24 in one side thereof, said groove having a radially disposed bottom wall 25 and frusto-conical walls 26 and 27 which intersect the inner and outer cylindrical walls 28 and 29 respectively to form sharp edges 14 and 15. The ring is placed at the end of a plurality of V-shaped packing rings in a stuffing box and serves to transmit axial thrust from the stuffing box gland to the packing. Since the rings are normally nested one within the V-shaped other, and are of such configuration as to exert a spreading effect upon the ends of the V of the packing rings, as shown by the arrows F, a radially inwardly directed force will also be exerted upon the adapter ring 10 at 14, and a radially outwardly directed force will similarly be exerted upon the adapter ring 10 at 15. Because of the thinness of the material at these points on the adapter ring 10, and the line of weakness created by the adjacent layer of cloth 12, the edges of the material are readily broken off, thus introducing fragments of resinous material into the stuffing box and depriving the packing of the desired support.

If a ring is made from reinforced tubing, such as is shown in the prior art ring of FIG. 2, or from a narrow strip wrapped radially to form a ring, the reinforcing cloth 16 appears as concentric rings, the weakest section of the ring being in the middle layer 17. Thus, when a spreading force such as F is impressed upon the ring of FIG. 2, there is a tendency for the ring to split along the layer 17 and thus destroy the confining effect desired in the ring.

In accordance with the method and ring of the present invention, the defects noted in the rings of FIGS. 1 and 2 are eliminated. In accordance with my new method, each ring is made individually rather than being cut out from either plate or tube stock, which reduces materially the waste encountered in the previous two methods. The blank is formed from a braided tube 18 such as is shown in FIGS. 4 and 5, said tube being made on a braider of known type used to form braided packing. The tube 18 thus is comprised of interwoven individual strands 19 of asbestos or cotton yarn. The yarn is preferably made of substantially untwisted individual threads for a purpose hereinafter to be described. The tube is formed as a continuous length which may be subsequently cut to provide the material required for a given-sized packing. The braider may be of either the vertical or horizontal type so that the braided tube travels in either a vertical or horizontal direction through the braider. The tube has the cylindrical cross-section shown in FIGURE 5, and the tube is preferably continuously coated as it is formed on the braider, inside and out, with powdered uncured thermosetting resin. Said tube may then be collapsed to form in effect a two-ply ribbon the plies of which are connected continuously along its sides such as shown in FIG. 6. The thickness of the strands, and the diameter of the tube, are selected to produce a ribbon the width of which is approximately equal to the radial thickness of the finished ring.

With the tube collapsed in ribbon form, an appropriate length as determined empirically is then cut off and formed into a helix having approximately the internal and outside diameters of the mold in which the ring is to be formed. The helically coiled ribbon is then subjected to heat and pressure in a mold to cure the thermosetting material and finish-form the adapter ring. In such finished ring the successive layers of the ribbon are disposed in the manner shown in FIG. 3.

It may be observed from FIG. 3 that the boundary layers 20 and 21, for example, which represent the juncture of successive coils, are not parallel to one another, and that they have their radially inner and outer regions oppositely inclined, respectively, to the axis of the ring. Thus forces such as F produced by a V shaped packing under axial compression are taken by the ring in a direction normal to the disposition of the boundary layer 20. This greatly minimizes any tendency by the packing compressed thereby to split the ring along the boundary layers 20 or 21.

The ring is also considerably stronger at its sharp edge regions 22 and 23 because of the presence of the folded edge of the tube, and the woven nature of the tube itself. The fact that the yarn is made of untwisted threads makes it possible to shape the yarn to fit into sharp corners and to fill all spaces between adjacent coils of the ribbon. There is also some knitting of adjacent coils together, all of which contributes to the overall strength of the finished ring.

The foregoing method of forming adapter rings may be used to form other machine elements from thermosetting materials. FIG. 8, for example, shows a sleeve or ring having a rectangular radial cross-section which is formed in precisely the same manner as the adapter ring of FIG. 3. Various types of tube and yarns for the tubes may be employed, as well as various types of powdered materials capable of being rendered cohesive or homogeneous upon the application of heat or pressure, or both. It is also possible to use metal wire either as one of the strands making up a yarn, or multiple strands of wire may be used in place of one or more of the yarns.

In some instances it may be desirable to use two or more concentrically arranged tubes, either of the same strands, or of strands of different strength or material. This can readily be accomplished by presently known braiding techniques which include braiding a first tube and then braiding a second tube around the first tube, and each tube can be coated or filled with thermosetting material as the braiding proceeds.

In all of the foregoing examples, the thermosetting material is not relied upon to give the preform body for handling purposes, and hence no partial cure of the thermosetting material is necessary. A partial curing operation is not precluded, however, and if, for example, the yarn used in the tube is of such soft nature as to render handling of the tube difficult, some form of partial cure may be resorted to. It is also contemplated that a liquid form of resin may be used instead of the powdered form to obtain better penetration of the resin into the yarn. Such liquid resin may be applied by passing the braided tube through one or more vats containing the liquid resin in a conventional dipping operation.

It is thus understood that the foregoing description is merely illustrative of preferred embodiments of this invention and that the scope of the invention is not to be limited thereto, but is to be determined by the appended claims.

I claim:

1. The method of forming a ring of thermosetting material reinforced with strands of fibrous material which comprises braiding a tube from fibrous untwisted threads of yarn, filling the tube with powdered substantially uncured thermosetting resin, collapsing the tube to form a two-ply ribbon, winding a predetermined length of the ribbon into a helix with the plane of the ribbon extending radially of the axis of the helix, and molding the helically wound ribbon under heat and pressure to form a coherent endless ring of the desired shape and dimensions.

2. The method of forming a ring of thermosetting material reinforced with strands of fibrous material which comprises braiding a tube from fibrous untwisted threads of yarn, coating the interior of the tube with substantially uncured thermosetting resin, collapsing the tube to form a two-ply ribbon, winding a predetermined length of the ribbon into a helix with the plane of the ribbon extending radially of the axis of the helix, and molding the helically wound ribbon under heat and pressure to form a coherent endless ring of the desired shape and dimensions.

3. The method of forming a ring of thermosetting material reinforced with strands of fibrous material which comprises braiding a tube of yarn, coating the interior and exterior of the tube with substantially uncured thermosetting resin, collapsing the tube to form a two-ply ribbon of substantially the radial width of the ring, winding a predetermined length of the ribbon upon itself into a helix with the plane of the ribbon extending radially of the axis of the helix, and compressing the ring in a heated mold axially of the ring to form a V-groove in the side of the ring and extend the side edges of the ribbon into the corners of the ring.

References Cited by the Examiner

UNITED STATES PATENTS

| | | | |
|---|---|---|---|
| 1,840,449 | 1/1932 | Hubbard et al. | 277—203 XR |
| 2,004,652 | 6/1935 | Dempsey | 156—196 XR |
| 2,028,961 | 1/1936 | Wheeler | 156—196 XR |
| 2,061,392 | 11/1936 | Wheeler | 277—231 XR |
| 2,240,358 | 4/1941 | Walters | 156—148 XR |
| 2,264,901 | 12/1941 | Gosling | 156—148 XR |
| 2,533,742 | 12/1950 | Poltorak | 156—196 XR |
| 2,538,198 | 1/1951 | Hosford | 277—205 XR |
| 2,584,825 | 2/1952 | Walters et al. | 156—148 XR |
| 2,599,826 | 6/1952 | Halstead et al. | 156—184 XR |

EARL M. BERGERT, *Primary Examiner.*